United States Patent
Ashitani et al.

(10) Patent No.: US 10,551,730 B2
(45) Date of Patent: Feb. 4, 2020

(54) IMAGE CAPTURING APPARATUS AND METHOD OF CONTROLLING THE SAME

(71) Applicant: CANON KABUSHIKI KAISHA, Tokyo (JP)

(72) Inventors: Satoshi Ashitani, Nagareyama (JP); Tomohiko Kuroki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/611,539

(22) Filed: Jun. 1, 2017

(65) Prior Publication Data
US 2017/0357152 A1    Dec. 14, 2017

(30) Foreign Application Priority Data

Jun. 10, 2016   (JP) ................................ 2016-116562

(51) Int. Cl.
| | | |
|---|---|---|
| *G03B 31/00* | (2006.01) | |
| *H04N 1/21* | (2006.01) | |
| *G11B 31/00* | (2006.01) | |
| *H04N 5/232* | (2006.01) | |
| *H04N 5/30* | (2006.01) | |

(52) U.S. Cl.
CPC ............. *G03B 31/00* (2013.01); *H04N 1/212* (2013.01); *G11B 31/006* (2013.01); *H04N 5/23212* (2013.01); *H04N 5/30* (2013.01)

(58) Field of Classification Search
USPC ........................................................ 348/14.1
See application file for complete search history.

(56) References Cited

U.S. PATENT DOCUMENTS

| | | | | |
|---|---|---|---|---|
| 2006/0227237 A1* | 10/2006 | Kienzle | ................ | G08B 13/194 348/343 |
| 2007/0229717 A1* | 10/2007 | Tseng | ................ | G11B 20/10527 348/738 |
| 2010/0172633 A1* | 7/2010 | Ohbitsu | ................ | G11B 27/005 386/239 |
| 2011/0305351 A1* | 12/2011 | Kimura | ................ | G03B 31/00 381/94.1 |
| 2012/0002047 A1* | 1/2012 | An | ........................ | H04N 7/15 348/143 |

FOREIGN PATENT DOCUMENTS

| | | |
|---|---|---|
| JP | H07-067013 A | 3/1995 |
| JP | 2004-336460 A | 11/2004 |
| JP | 2006-279185 A | 10/2006 |
| JP | 2011-257656 A | 12/2011 |

* cited by examiner

*Primary Examiner* — Amal S Zenati
(74) *Attorney, Agent, or Firm* — Canon U.S.A., Inc. IP Division

(57) ABSTRACT

An image capturing apparatus including an audio input unit and a driving unit attenuates or disables driving sounds of the driving unit and post-driving sounds as appropriate to reduce unnecessary sounds and improve usefulness of audio data, and an image capturing apparatus including an image capturing unit, a panning/tilting unit configured to change an image capturing direction, and an audio input unit attenuates or disables an audio-related function while the panning/tilting unit is driving and until a predetermined determination condition is satisfied after the driving.

13 Claims, 12 Drawing Sheets

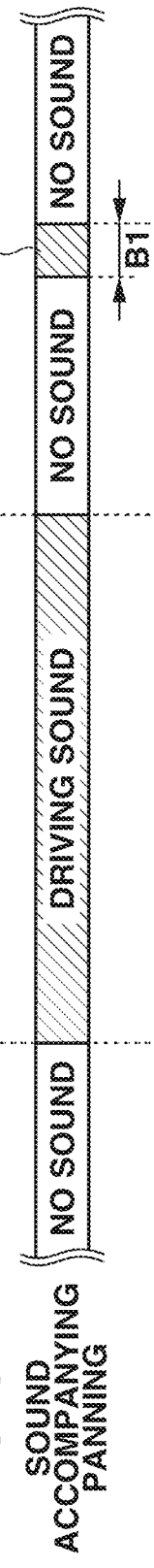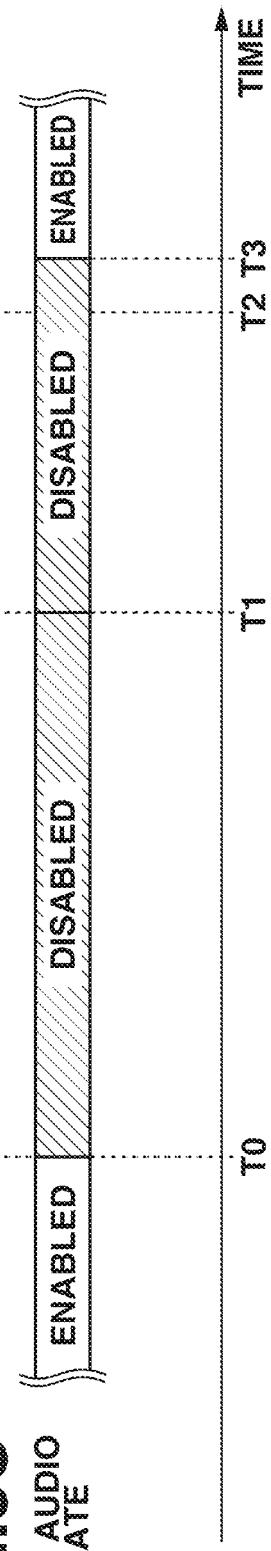

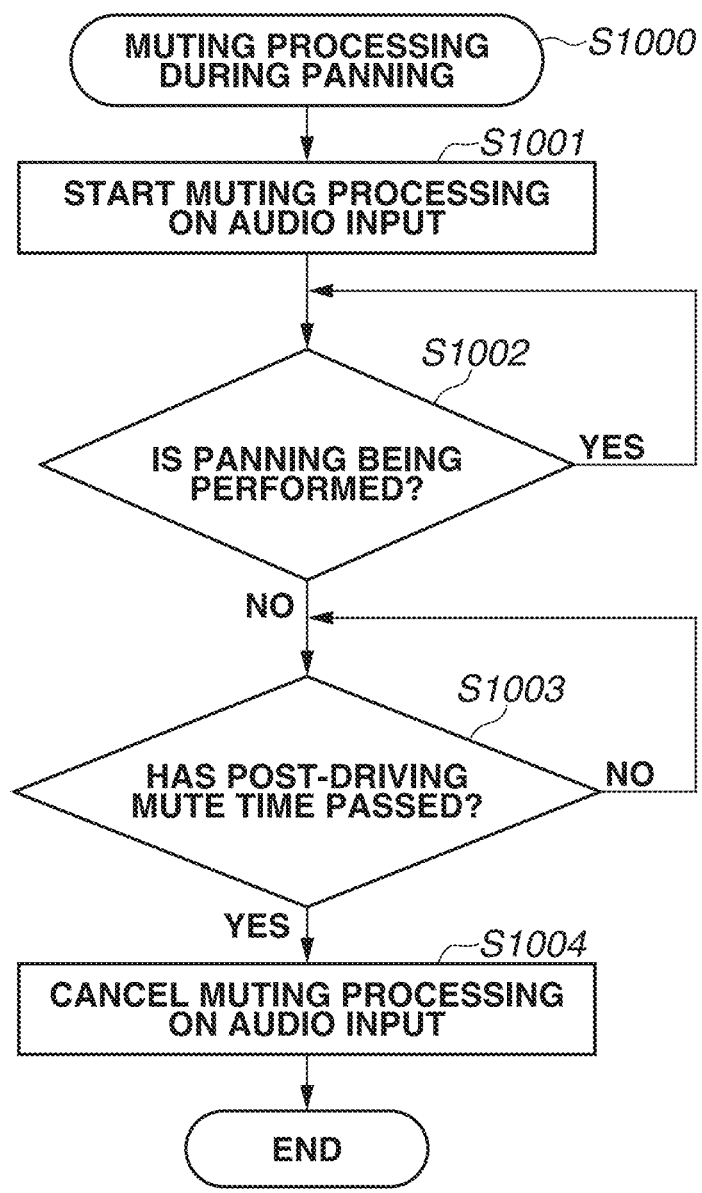

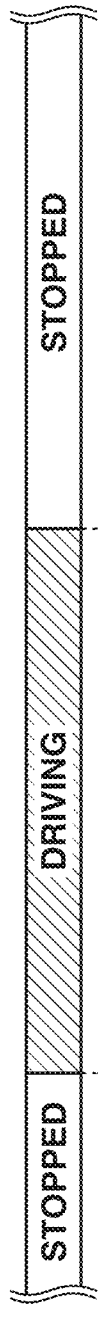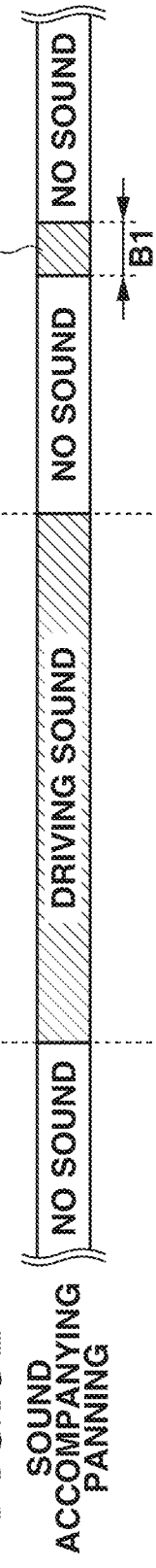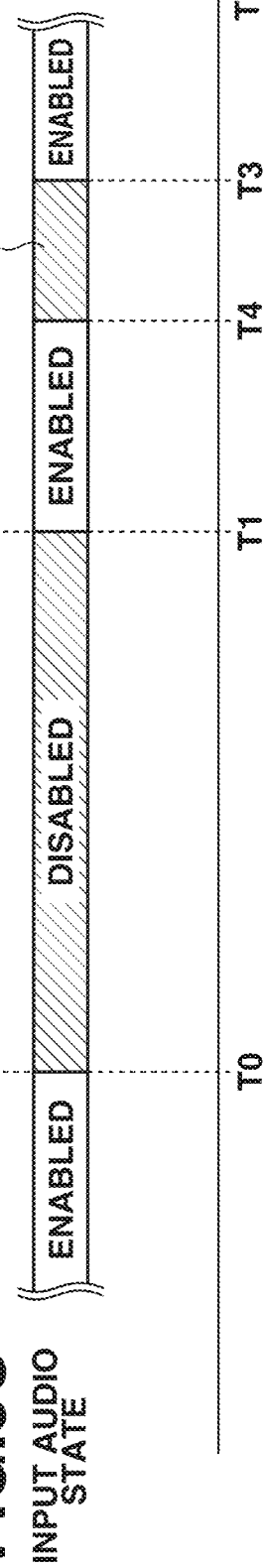

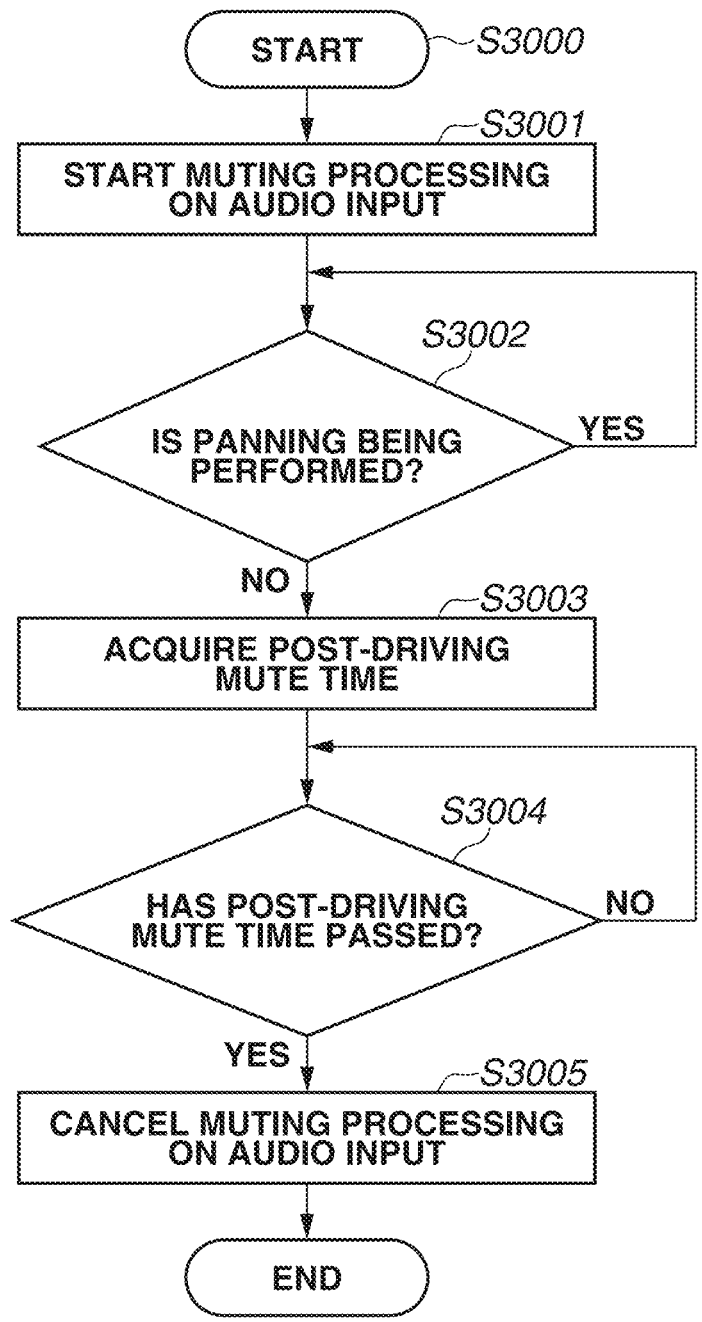

FIG.7

| PANNING ANGLE [deg] | POST-DRIVING MUTE TIME [msec] |
|---|---|
| -175 – -100 | 10 |
| -100 – -45 | 50 |
| -45 – +45 | 100 |
| +45 – +100 | 50 |
| +100 – +175 | 10 |

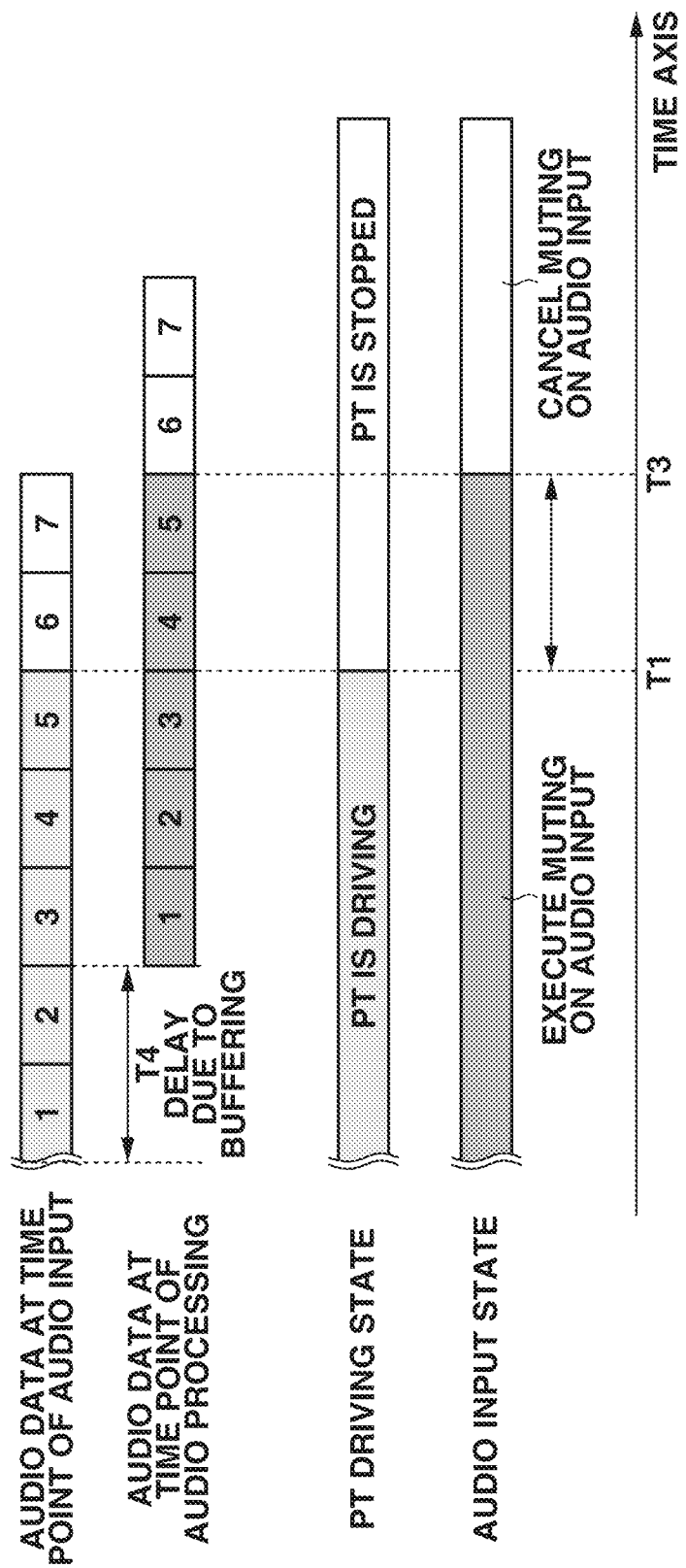

IMAGE CAPTURING APPARATUS AND METHOD OF CONTROLLING THE SAME

BACKGROUND

Field of Art

The present disclosure relates to an image capturing apparatus and a method of controlling the same and, in particular, relates to an image capturing apparatus capable of receiving audio input.

Description of the Related Art

Conventional network cameras are known in which cameras are controlled by remote operations via a network or dedicated line to monitor video images. Some models of the network cameras include driving units for panning (horizontal rotation) and tilting (vertical rotation) to rotate a camera head portion. Some other models are capable of performing electric zoom operations. In these models, the direction in which images are captured and the angle of view at which images are captured can be changed freely.

Further, some of the network cameras include an audio input unit to perform a function of streaming not only video images but also audio to distant destinations, a function of detecting an abnormality using audio when the volume exceeds a predetermined level, or a function of recognizing a feature of a specific sound such as a scream of a person to detect an abnormality. The audio input unit includes an interface for connecting a microphone, etc. or includes a built-in microphone so that no external microphone is required.

A camera which includes a built-in microphone and is capable of performing panning and tilting has a problem that the built-in microphone picks up driving sounds produced during the operation of a panning/tilting unit and unnecessary sounds are recorded. Further, a camera having the function of detecting an abnormality using audio has a problem that it can erroneously detect sounds due to the driving sounds. To overcome the problems, the conventional techniques mute sounds during panning/tilting operations or disable audio detection to prevent erroneous detection.

Japanese Patent Application Laid-Open No. 2004-336460 discusses a method of preventing erroneous processing associated with driving sounds. In the method, the gain of audio signals acquired by a microphone is lowered during a time period in which an image capturing apparatus performs panning and tilting so that the driving sounds do not exceed an audio detection level.

Meanwhile, a stepping motor used as a panning/tilting driving source is generally controlled in such a manner that excitation (hereinafter, "post-driving excitation") is applied for a predetermined time period after driving of the motor is started until mechanical components are settled instead of disconnecting electric current immediately after driving of the motor is started. Thereafter, the post-driving excitation is cut, and processing for shifting to a stopped state is performed. At this time, if a holding torque of the stepping motor that is generated by the excitation is lost at the timing when the post-driving excitation is stopped, the stable state of force is changed, so that the mechanical components slightly move due to the effect of reaction force of a mechanical drive transmission system having resiliency, the effect of gravity, etc. This can produce sounds other than the driving sounds.

Further, some network cameras perform panning and tilting called "edge-contact operation" as an operation of adjusting the imaging angle of view at the time of activation/initialization to adjust the initial position thereof by contacting the mechanical end.

However, the conventional technique discussed in Japanese Patent Application Laid-Open No. 2004-336460 does not consider sounds that are produced after driving, so problems can arise that unnecessary sounds produced after driving are recorded and sounds are erroneously detected. Further, when the driving and stopping are repeated during the sequential operation for adjusting the initial positioning by "edge-contact operation", the audio recording and the abnormality detection are enabled and disabled intermittently, and this causes inconvenience to the user.

SUMMARY

The present disclosure is directed to a technique for improving usefulness of audio data by controlling functions which relate to audio recording and audio detection in an image capturing apparatus including an audio input unit and a driving unit according to driving sounds of the driving unit and post-driving operations.

According to an aspect of the present embodiment, an image capturing apparatus includes an image capturing unit configured to capture an image of an object, a driving unit configured to change an image capturing direction in a panning direction or a tilting direction, an audio processing unit configured to collect a sound from a surrounding area and output an audio output, and a control unit configured to perform control to attenuate or disable the audio output when the driving unit is driving, wherein when the driving unit is driving, the control unit attenuates or disables the audio output, and when the driving unit stops driving, the control unit attenuates or disables the audio output based on a comparison with a predetermined determination condition.

Features of the present invention will become apparent from the following description of exemplary embodiments with reference to the attached drawings.

BRIEF DESCRIPTION OF THE DRAWINGS

FIGS. 3A, 3B, and 3C are timing charts illustrating muting processing performed during panning and tilting operations of the image capturing apparatus according to the first exemplary embodiment.

FIG. 4 is a flow chart illustrating audio muting processing which is performed by the image capturing apparatus according to the first exemplary embodiment.

FIGS. 5A, 5B, and 5C are timing charts illustrating muting processing performed during panning and tilting operations of the image capturing apparatus according to the first exemplary embodiment.

FIG. 6 is a flow chart illustrating muting processing performed during panning and tilting operations of an image capturing apparatus according to a second exemplary embodiment.

FIG. 7 illustrates an example of a post-driving mute time table used in the image capturing apparatus according to the second exemplary embodiment.

FIG. 9 is a timing chart illustrating audio processing and muting processing performed during panning and tilting operations of an image capturing apparatus according to a fourth exemplary embodiment.

DESCRIPTION OF THE EMBODIMENTS

Various exemplary embodiments will be described in detail below with reference to the drawings.

Figure 1:
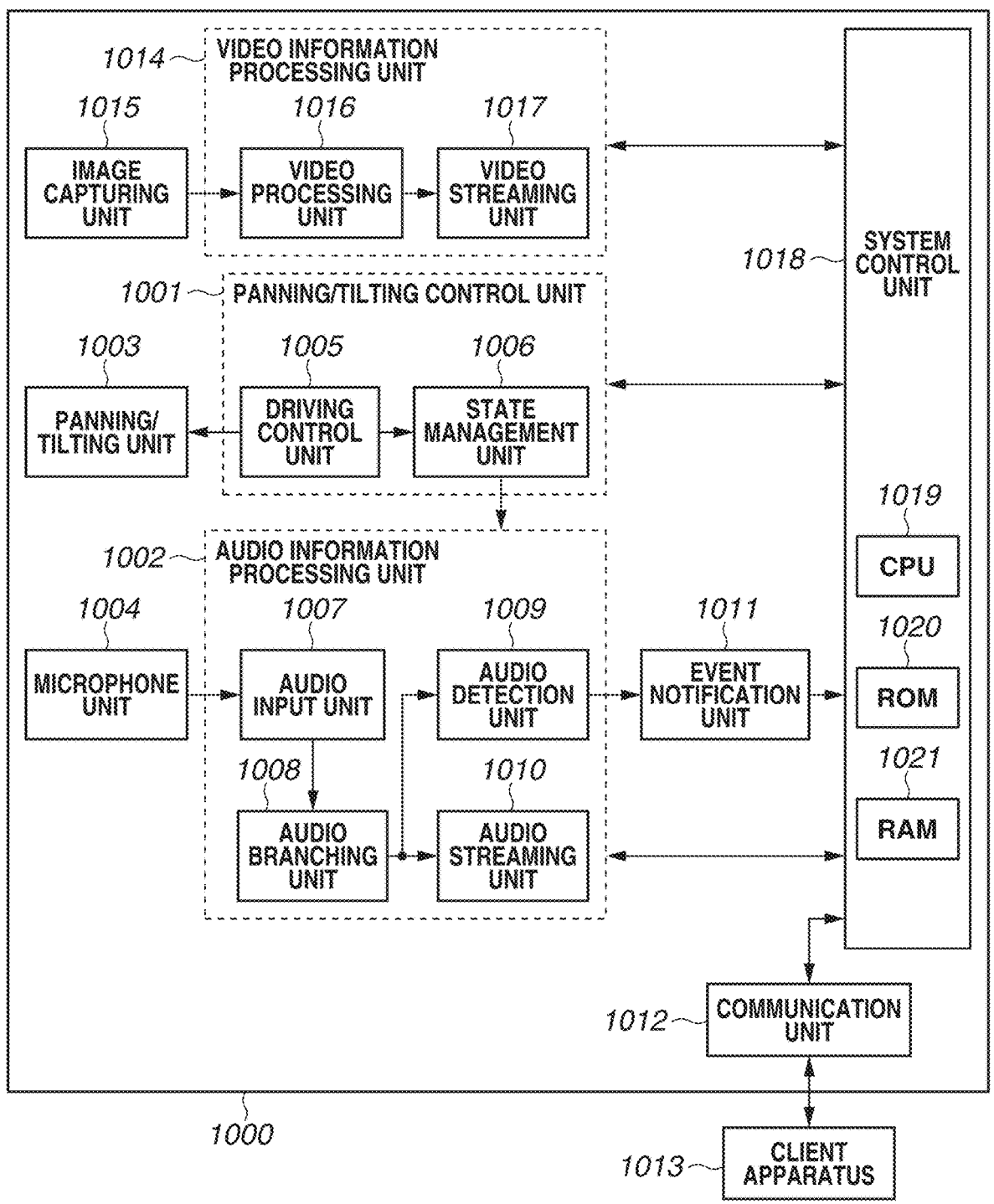
FIG. 1 is a block diagram illustrating an example of a configuration of an image capturing apparatus according to a first exemplary embodiment.

The following describes an example of a configuration of an image capturing apparatus 1000 according to a first exemplary embodiment with reference to FIG. 1. FIG. 1 is a block diagram illustrating an example of a configuration of the image capturing apparatus 1000 according to the first exemplary embodiment.

An image capturing apparatus 1000 is connected to a client apparatus (information processing apparatus) 1013 to communicate with each other. The image capturing apparatus 1000 is capable of detecting using captured images and sounds, an abnormality in an image capturing environment. When an abnormality is detected, the image capturing apparatus 1000 transmits an event notification to the client apparatus 1013. The abnormality may be detected in the audio based on when the volume of the audio exceeds a predetermined level, or a function of recognizing a feature of a specific sound such as a scream of a person.

The image capturing apparatus 1000 includes an image capturing unit 1015, a video information processing unit 1014, a panning/tilting unit 1003, a panning/tilting control unit 1001, a microphone unit 1004, an audio information processing unit 1002, and a system control unit 1018. These units can transmit and receive instructions and information to and from each other via a communication bus (not illustrated). The audio information processing unit 1002 may be configured as an audio processing unit that is configured to collect sound from the surrounding area and performs audio output. The audio processing unit may be implemented as one or more dedicated circuits or may be a set of instructions encoded on a non-transitory medium which are executed by one or more processors. The audio processing unit may include an analog to digital converter. The audio processing unit may output an analog signal(s) and/or digital signal(s).

The image capturing unit 1015 includes a lens, an image capturing element, and control circuits thereof. The image capturing unit 1015 captures an image of an object, performs conversion of the captured image into an electric signal, and generates object image data.

The video information processing unit 1014 includes a video processing unit 1016 and a video streaming unit 1017. The video processing unit 1016 performs predetermined development processing and compression encoding processing on the signals converted photoelectrically from the captured images by the image capturing unit 1015 to generate image data. The video streaming unit 1017 streams video data processed by the video processing unit 1016 to the client apparatus 1013 via a communication unit 1012 according to an instruction from the system control unit 1018.

The panning/tilting unit 1003 (PT driving unit) includes a mechanical driving system and a stepping motor which is a driving source of the mechanical driving system. The mechanical driving system changes the panning (horizontal direction) and tilting (vertical direction) of an image capturing direction in which the image capturing unit 1015 captures images. The panning/tilting unit 1003 is controlled by the panning/tilting control unit 1001.

The panning/tilting control unit 1001 receives camera control commands from the client apparatus 1013 via the system control unit 1018. The panning/tilting control unit 1001 includes a driving control unit 1005 and a state management unit 1006.

The driving control unit 1005 transmits an instruction to operate the received camera control commands to the panning/tilting unit 1003, and the panning/tilting unit 1003 changes the imaging angle of view in response to the instruction.

The state management unit 1006 manages a current panning/tilting state and coordinates information, and a notification of the panning/tilting state and coordinates information can be transmitted to the blocks included in the image capturing apparatus 1000. The panning/tilting state and coordinates information stored by the state management unit 1006 may include a camera viewing orientation.

The microphone unit 1004 collects sounds from a surrounding area in the image capturing direction and inputs the collected sounds to the audio information processing unit 1002.

The audio information processing unit 1002 includes an audio input unit 1007, an audio branching unit 1008, an audio detection unit 1009, and an audio streaming unit 1010. Further, the audio information processing unit 1002 performs audio control to enable/disable detection processing performed by the audio detection unit 1009.

The audio input unit 1007 acquires the input audio from the microphone unit 1004 and performs predetermined audio processing and compression encoding processing on the audio signals to generate audio data. The audio branching unit 1008 outputs the audio data generated by the audio input unit 1007 to the audio detection unit 1009 and the audio streaming unit 1010. The audio data output to the audio detection unit 1009 and the audio streaming unit 1010 can be an exact copy of the input audio data, or the input audio data can be converted into audio data for detection and audio data for streaming and output to the audio detection unit 1009 and the audio streaming unit 1010.

The audio detection unit 1009 performs abnormality detection based on the audio data input from the audio branching unit 1008, and if an abnormality is detected, the audio detection unit 1009 notifies the client apparatus 1013 of the detected event via an event notification unit 1011 and the communication unit 1012. The detected event is information that indicates abnormality. The audio detection unit 1009 may detect an abnormality using dedicated circuitry or instruction encoded on a non-transitory computer readable medium executed by one or more processors.

The audio streaming unit 1010 transmits the audio data (audio output) input from the audio branching unit 1008 to the client apparatus 1013 via the communication unit 1012.

The system control unit 1018 analyzes the transmitted camera control commands and performs processing according to the commands. For example, the system control unit 1018 instructs the video processing unit 1016 to adjust image quality, instructs the image capturing unit 1015 to perform zoom and focus control, and instructs the panning/tilting control unit 1001 to perform panning/tilting operations. The image capturing unit 1015 performs lens control based on the transmitted instruction. Further, the panning/tilting control unit 1001 controls the panning/tilting unit 1003 using the driving control unit 1005 based on the transmitted instruction, and stores information about the driving in the state management unit 1006.

The system control unit 1018 includes a central processing unit (CPU) 1019, a read-only memory (ROM) 1020, and a random access memory (RAM) 1021. The CPU 1019 controls each unit connected via the communication bus and performs necessary calculation for the control according to a program loaded from the ROM 1020. In the ROM 1020 are stored control programs to be executed by the CPU 1019 and various types of constant values that are necessary for execution of the programs. The RAM 1021 is an area for storing various types of temporary data necessary for execution of the programs.

The communication unit 1012 is connected to the client apparatus 1013, which is an external apparatus, via a wireless or wired network. The communication unit 1012 receives the camera control commands transmitted from the client apparatus 1013 and transmits the received camera control commands to the system control unit 1018. Further, the communication unit 1012 transmits responses to the camera control command to the client apparatus 1013.

In the client apparatus 1013, the image capturing environment is monitored based on the video streamed from the video streaming unit 1017, the audio streamed from the audio streaming unit 1010, and the notification of the detected event from the event notification unit 1011. While the audio-based abnormality detection is described in the present exemplary embodiment, the event notified by the event notification unit 1011 is not limited to the above-described event and can be any of various events such as an abnormality detected from an image or an abnormality detected by an external sensor.

Figure 2B:
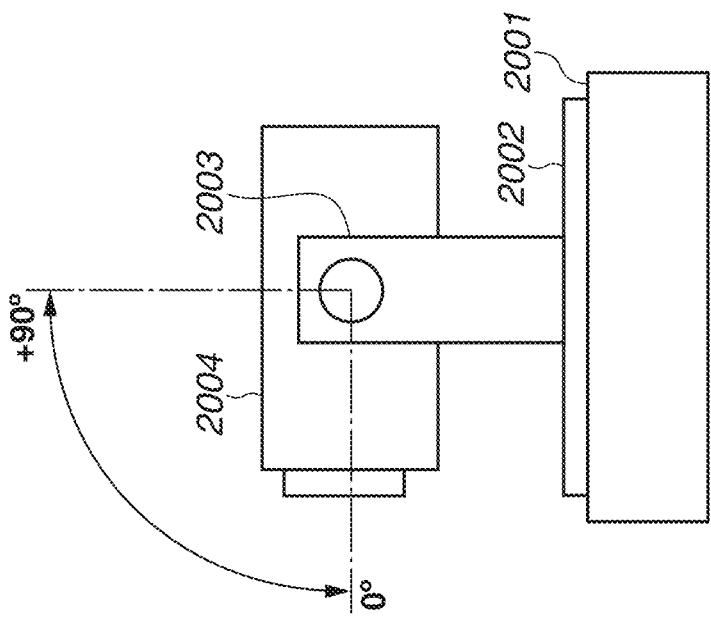
FIGS. 2A and 2B each illustrate a mechanical configuration of the image capturing apparatus according to the first exemplary embodiment.
Figure 2A:
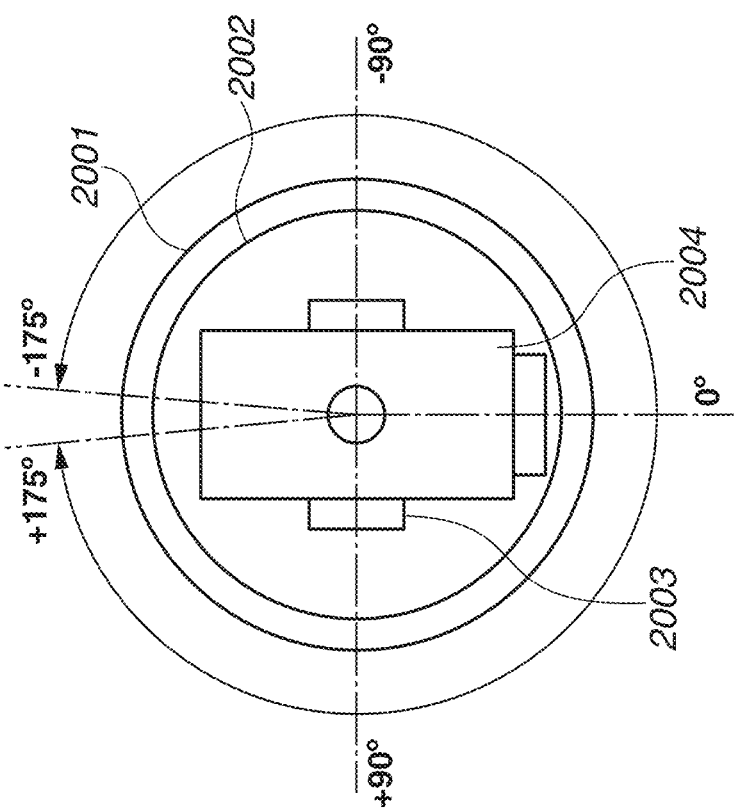

The following describes operations of a panning/tilting movable unit with reference to FIGS. 2A and 2B. FIGS. 2A and 2B each illustrate a mechanical configuration of the image capturing apparatus 1000 according to the present exemplary embodiment. FIG. 2A is a top view thereof as seen from above, and FIG. 2B is a side view thereof. In FIGS. 2A and 2B, a bottom case 2001, a turntable 2002, a camera head support 2003, and a camera head 2004 are specified.

In FIGS. 2A and 2B, the turntable 2002 is rotated in a horizontal direction with respect to the bottom case 2001 fixed to a wall surface, ceiling, etc. to move the image capturing direction in a panning direction. The image capturing apparatus 1000 according to the present exemplary embodiment is movable in the panning direction within a range of −175 degrees rightward to +175 degrees leftward.

The camera head 2004 supported by the camera head support 2003 is rotated in a vertical direction to move the image capturing direction in a tilting direction. The image capturing apparatus 1000 according to the present exemplary embodiment is movable in the tilting direction within a range of 0 degrees in the horizontal direction to 90 degrees in an upward direction.

FIGS. 3A to 3C are timing charts illustrating muting processing performed during panning and tilting operations of the image capturing apparatus according to the present exemplary embodiment. While FIGS. 3A, 3B, and 3C respectively illustrate a panning state, a sound accompanying the panning, and an input audio state along a time axis as an example, the driving operation can be a movement in the tilting direction. Further, the muting processing is also applicable to lens driving such as zooming or focusing.

In FIGS. 3A to 3C, up to a time T0, the panning state is "stopped" (FIG. 3A), there is "no" sound accompanying the panning (FIG. 3B), and the input audio state is "enabled" (FIG. 3C). Since there is no driving sound of panning and tilting, audio-related functions such as abnormality detection using audio data or audio are enabled.

Next, at the time T0, when the panning state is changed to "driving" (FIG. 3A), driving sounds are produced by the driving in the sound accompanying the panning (FIG. 3B). Thereafter, at a time T1, when the panning state is changed to a "stopped" state (FIG. 3A), there is "no" sound accompanying the panning (FIG. 3B), but sounds are produced during a period B1 due to the post-driving excitation having been stopped. Specifically, at the timing when the post-driving excitation is stopped, if a holding torque of the stepping motor that is generated by the excitation is lost, the stable state of force is changed, so that the mechanical components slightly move due to the effect of reaction force of a resilient mechanical drive transmission system, gravity, etc. This can produce sounds other than the driving sounds.

The input audio state is "disabled" (FIG. 3C) during the period in which sounds accompanying the panning are produced and the period B1 in which post-driving sounds are produced (FIG. 3B). For example, the input audio state is "disabled" (FIG. 3C) by not recording audio data, by muting audio input, by not performing audio-based abnormality detection, and by other means. At a time T3 on or after a time T2 at which the period B1 during which post-driving sounds are produced passes, the input audio state is "enabled" (FIG. 3C). The times T2 and T3 can be the same timing.

FIG. 4 is a flow chart illustrating audio muting processing performed by the image capturing apparatus 1000 according to the present exemplary embodiment. FIG. 4 illustrates a process executed by controlling the processing blocks of the image capturing apparatus 1000, and a program stored in the ROM 1020 included in the system control unit 1018 is developed into the RAM 1021 and executed by the CPU 1019 to realize the process.

In the example illustrated in FIGS. 3A to 3C, the system control unit 1018 starts the process of audio muting processing at the time T0 at which the panning is started. The system control unit 1018 may thus be configured a control unit that controls the audio output. The control unit may be implemented as one or more dedicated circuits or may be a set of instructions encoded on a non-transitory medium which are executed by one or more processors. The control unit and the audio unit may be combined into a single unit.

If the panning/tilting is started, then in step S1001, the system control unit 1018 instructs the audio information processing unit 1002 to mute input audio. The audio information processing unit 1002 performs muting processing on audio data input from the microphone unit 1004.

Next, in step S1002, the system control unit 1018 monitors the panning state via the state management unit 1006 of the panning/tilting control unit 1001 and determines whether the panning is being performed. If the panning is being performed (YES in step S1002), the determination processing is continued. When the panning is changed from the driving state to the stopped state (NO in step S1002), the processing proceeds to step S1003. When the panning is changed from the driving state to the stopped state, a comparison with a predetermined determination condition is performed, and the audio muting is continued based on a result of the comparison. The state management unit 1006 may be implemented by dedicated circuitry or instructions encoded on a non-transitory computer readable medium which are executed by one or more processors. The state management unit 1006 may keep track of the camera viewing direction based on a position encoder or by keeping track of the driving history of the camera relative to a known camera viewing direction. In an alternative embodiment, the state management unit 1006 may use video information from the camera to determine a current viewing direction or a past viewing direction.

In step S1003, the system control unit 1018 determines whether a post-driving mute time which is set after the panning is stopped has passed. The post-driving mute time is a period from the time T1 to the time T2 and is a preset value. For example, if sounds are produced during a period of several to about 20 milliseconds after the post-driving excitation is stopped, the time during which the post-driving muting processing is performed (hereinafter, "post-driving mute time") is set to 30 milliseconds. If the post-driving mute time has not passed (NO in step S1003), the determination processing is continued. On the other hand, if the post-driving mute time has passed (YES in step S1003), the processing proceeds to step S1004.

In step S1004, the system control unit 1018 instructs the audio information processing unit 1002 to cancel the muting processing on input audio. The audio information processing unit 1002 cancels the muting processing on the input audio that is input from the microphone unit 1004, and the process is ended.

In this way, the input audio is muted during the panning and a predetermined period following the panning to disable driving sounds of the panning unit and sounds produced after the driving. Similarly, the input audio is muted during the tilting and a predetermined period following the tilting as in the above-described processing to disable driving sounds of the tilting unit and audio data generated after the driving.

As described above, in the image capturing apparatus including the audio input unit and the driving unit, the input audio is muted while the driving unit is driving and during a period in which post-driving sounds are produced. In this way, unnecessary audio data is reduced.

While the method in which the muting processing is performed during the driving and continuously performed for a predetermined time following the driving is described in the present exemplary embodiment, the present exemplary embodiment is not limited to the above-described method. For example, in a case in which it is known that sounds will be generated after a predetermined time passes following the driving, the muting processing can be cancelled after the driving and then performed again before or after the post-driving sounds are produced.

FIGS. 5A to 5C illustrate an example of timing charts illustrating the muting processing during the panning and tilting operations of the image capturing apparatus 1000 according to the present exemplary embodiment. In FIGS. 5A to 5C, when the panning state is changed from "driving" to "stopped" (FIG. 5A), the input audio state is switched from "disabled" to "enabled" (FIG. 5C). Thereafter, the input audio state is "disabled" again (FIG. 5C) during a period between times T4 and T3 including the period B1, during which post-driving sounds are produced, after a predetermined time passes. For example, in a case in which it is known that sounds will be produced after about 20 milliseconds following the stopping of the post-driving excitation, the audio is "enabled" after the driving is stopped, and the audio is "disabled" (muting processing) again at the time T4, which is 20 milliseconds after the driving.

After the panning is stopped, the muting processing is performed during the period in which post-driving sounds are produced, and the muting processing is not performed during the previous period in which post-driving sounds are not produced. As described above, in the case in which it is known that sounds will be produced after the predetermined period passes following the driving, the muting processing is cancelled after the driving and is performed again before or after the post-driving sounds are produced. In this way, an unnecessary muting processing time is reduced.

Next, the following describes a second exemplary embodiment in which a difference in sound production according to the state of the driving unit is considered, with reference to FIGS. 6 and 7. Processing which is similar to the processing in the first exemplary embodiment is given the same reference numeral, and description thereof is omitted.

As to sounds that are produced when the mechanical components slightly move after the post-driving excitation applied to the stepping motor of the driving unit is stopped, the timing at which the sounds are produced and the volume of the sounds differ depending on the state of the driving unit. For example, a direction in which the gravity affects the panning/tilting unit 1003 varies depending on a state in which the camera is placed. For example, the direction varies depending on whether the camera is positioned upside up in such a manner that the lens faces upward or the camera is positioned upside down in such a manner that the lens faces downward. Further, the mechanism is structured such that the reaction force of harnesses through which signal lines connecting substrates in the camera and power lines pass affects the panning/tilting unit 1003. Rotation of the panning/tilting unit 1003 can change the arrangement of the harnesses, so that the influence of the reaction force of the harnesses also changes.

As described above, when the influence of the force applied to the driving unit is changed according to the state in which the camera is installed and an operation state of the driving unit, the timing at which sounds are produced after the post-driving excitation is cut and the volume of the sounds are changed. If the post-driving muting processing time is set uniformly with respect to the changing sounds, the sounds to be muted are not successfully muted, or the muting processing is performed for an excessively long time. In the present exemplary embodiment, the post-driving audio processing is performed suitably according to a difference in sounds that are generated after the post-driving excitation is cut and changed depending on the state of the driving unit. In this way, usefulness of audio data (audio output) is further improved.

FIG. 6 is a flow chart illustrating a process of muting processing during the panning tilting operations of the image capturing apparatus according to the present exemplary embodiment. FIG. 6 illustrates a process executed by controlling the processing blocks of the image capturing apparatus 1000, and a program stored in the ROM 1020 included in the system control unit 1018 is developed into the RAM 1021 and executed by the CPU 1019 to realize the process.

Steps S3001 and S3002 are similar to steps S1001 and S1002 in FIG. 4, so description of steps S3001 and S3002 is omitted.

In step S3002, if it is determined that the panning is stopped (NO in step S3002), the processing proceeds to step S3003. In step S3003, the system control unit 1018 acquires a post-driving mute time.

FIG. 7 illustrates an example of a post-driving mute time table used in the image capturing apparatus according to the present exemplary embodiment. The post-driving mute time table is a table that shows a list of suitable mute times for post-driving sounds that differ according to the position of the panning unit. The post-driving mute time table is stored in the RAM 1021 included in the system control unit 1018. For example, in a case in which the panning stop position is −90 degrees, the post-driving mute time of 50 milliseconds is acquired by referring to the post-driving mute timetable.

In step S3004, the system control unit 1018 determines whether the post-driving mute time has passed using the post-driving mute time acquired in step S3003.

A step following step S3004 is similar to the step following step S1003 in FIG. 4, so detailed description thereof is omitted.

As described above, the suitable mute time is set for the post-driving sounds that differ according to the position of the panning unit. In this way, unnecessary audio data is reduced without excessively disabling the audio data.

While the method in which the suitable mute time is set for the post-driving sounds that differ according to the position of the panning unit is described in the present exemplary embodiment, the method is not limited to the above-described method. For example, in a case in which the sounds produced after the driving differ depending on the state in which the camera is installed, e.g., upside-up or upside-down, or the driving speed, the suitable post-driving mute time is set for the produced sounds so that the processing to disable the audio data (audio output) is performed more suitably.

Further, while the method in which the setting of the post-driving mute time is changed is described in the present exemplary embodiment, the method is not limited to the above-described method. For example, the setting of an attenuation time and attenuation rate in attenuation processing, the post-driving, pre-muting time described in the first exemplary embodiment, etc. can be changed as appropriate.

Further, while the method in which the suitable post-driving mute times for the respective positions of the panning unit are held in the table is described in the present exemplary embodiment, the method is not limited to the above-described method. For example, if the post-driving mute time with respect to the position of the panning unit can be expressed by a predetermined relational formula, a method in which the post-driving mute time for the panning position is calculated using the relational formula can be employed.

Figure 8A:
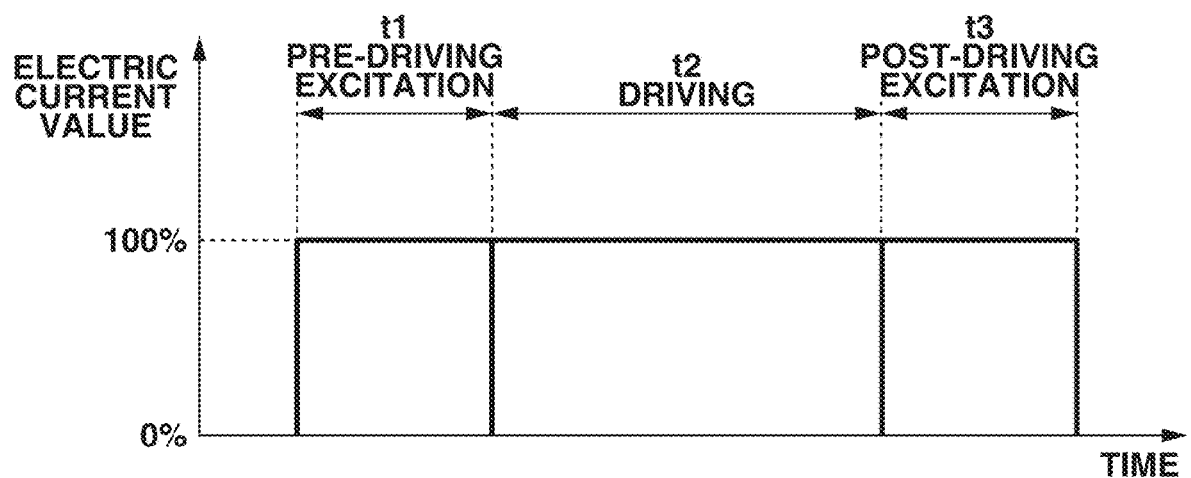
FIGS. 8A and 8B each illustrate current amplitude values applied to a motor of a panning unit of an image capturing apparatus according to a third exemplary embodiment.
Figure 8B:
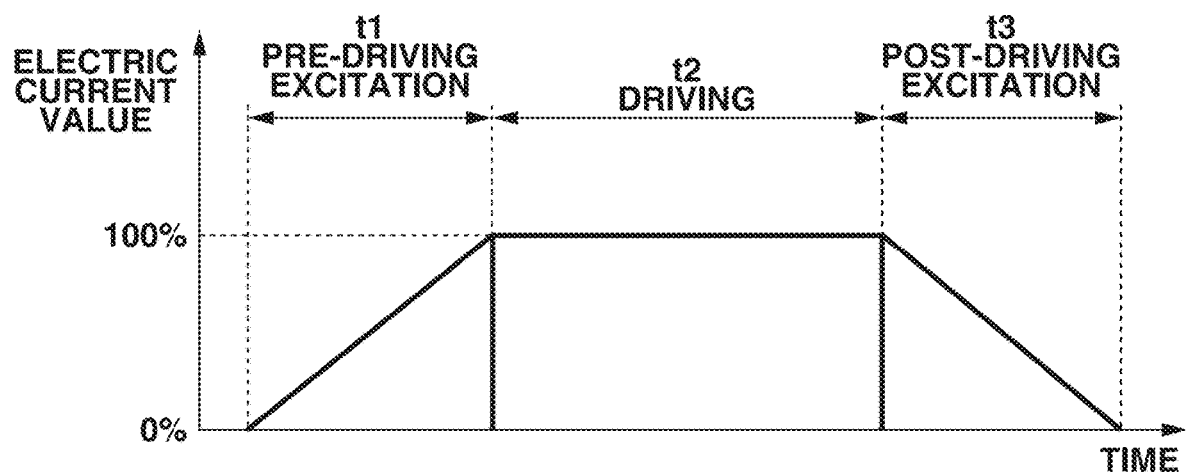

Next, the following mainly describes a third exemplary embodiment in which a difference in post-driving excitation method is considered, with reference to FIGS. 8A and 8B. Processing which is similar to the processing in the first and second exemplary embodiments is given the same reference numeral, and description thereof is omitted.

FIGS. 8A and 8B illustrate current amplitude values applied to the stepping motor of the panning unit of the image capturing apparatus according to the present exemplary embodiment. While the electric current applied during the driving is a rectangular wave of a frequency corresponding to a motor rotation period or a sine wave, only the current amplitude values are illustrated FIGS. 8A and 8B to suit the intention of the description. As illustrated in FIG. 8A, excitation is applied for a time t1 before the driving, and then the driving current is applied for a time t2 during which the driving is performed. After the driving, an electric current value of 100% for post-driving excitation is applied for a time t3, and after the time t3 passes, the electric current value is decreased to 0% to change to the stopped state. The above-described sounds that are produced when the mechanical components slightly move after the post-driving excitation applied to the stepping motor of the driving unit is cut are probably caused by the instantaneous change in excitation from 100% to 0%.

Thus, in FIG. 8B, the post-driving excitation is decreased gradually from 100% to 0% over the time t3. For example, at the time point at which the post-driving excitation time passes 10% of the time t3, an electric current value of 90% is set. Further, at the time point at which the post-driving excitation time passes 20% of the time t3, an electric current value of 80% is set. The processing to set the electric current value according to the passed time to gradually decrease the electric current value as described above is continued until the time t3 of post-driving excitation passes.

In this way, the movement of the mechanical components that is caused by a change in excitation is reduced so that sounds accompanying the movement are less likely to be produced. In this case, the post-driving mute time can be set shorter than that in the case in which the excitation is cut from 100% to 0% as illustrated in FIG. 8A.

While the electric current value is gradually increased also during the time t1 of pre-driving excitation in FIG. 8B, the peak electric current can be applied from the beginning as in FIG. 8A.

As described above, in the image capturing apparatus including the audio input unit and the driving unit, the movement of the mechanical components that is caused by the way the post-driving excitation is applied to the stepping motor of the driving unit is reduced so that sounds accompanying the movement are less likely to be produced to enable a shorter post-driving mute time to be set. In this way, audio data to be disabled is reduced to enable more audio data to be utilized.

While the method in which the way of applying the post-driving excitation is uniformly set is described in the present exemplary embodiment, the method is not limited thereto. For example, in a case where an appropriate way of applying the post-driving excitation varies depending on the installation state and the position and speed of the driving unit, the way of applying the post-driving excitation can be changed according to the state of the driving unit. The predetermined time after which the driving time stops and audio output is adjusted may be based on one or more of the installation state of the camera, the speed of the driving unit, the position of the camera as driven by the driving unit, an orientation of the camera, a direction in which the camera captures images, and/or a delay time of processing audio. The installation state may refer how the camera is fixed to a surface such as a wall, ceiling, post, etc.

Further, while the method in which the post-driving electric current value is linearly decreased over the predetermined time is described in the present exemplary embodiment, the method is not limited thereto. For example, the post-driving excitation can be applied such that the post-driving electric current value is decreased step by step to stabilize a static state after the motor is driven and to reduce sounds to be produced.

Next, the following describes a fourth exemplary embodiment in which audio muting processing is performed according to a delay time originating from the processing speed of audio buffering processing, with reference to FIG. 9. Processing which is similar to the processing in the first to third exemplary embodiments is given the same reference numeral, and description thereof is omitted.

The audio input unit 1007 performs buffering processing on input audio from the microphone unit 1004 to generate audio data. In the case in which the audio data is to be disabled, the audio data that is attenuated therein or silent data is output to the audio branching unit 1008. The audio data acquired by the audio branching unit 1008 is output to the audio detection unit 1009 and the audio streaming unit 1010.

FIG. 9 illustrates an example of timing charts illustrating the audio processing and the muting processing performed during the panning and tilting operations of the image capturing apparatus according to the present exemplary embodiment. In FIG. 9, there is a delay by a time t4 between the timing at which audio is input and the timing at which the processing is performed during internal processing on the audio input from the microphone unit 1004 that accompanies the above-described audio data buffering processing, etc.

The driving state of panning and tilting is monitored, and if audio input muting processing is cancelled immediately after the driving state of panning and tilting is changed from the driven state to the stopped state, the audio data to be processed at this time point is the audio data input at a time point before the time t4 due to the delay associated with the processing. If the audio is enabled at a time T1 immediately after the driving of panning and tilting is stopped, the muting on audio data 4 and audio data 5 during the driving of panning and tilting is also cancelled.

Thus, the delay time associated with the audio data buffering processing is also considered and is added immediately after the panning/tilting state is changed from "driving" to "stopped", and the post-driving mute time is set. In FIG. 9, the time t4 is set as the post-driving mute time. Control is performed to cancel the audio muting at a time T3, at which the time t4 has passed since the stop of the panning/tilting (T1). In this case, as to the timing for starting muting after the driving of panning and tilting is started, the audio muting can be started not immediately after the start of driving of panning and tilting but after the time t4 has passed since the start of driving of panning and tilting.

As described above, the post-driving mute time is set with the delay time in audio data buffering processing taken into consideration, so that recording and streaming of unnecessary audio data during the driving of panning and tilting can be reduced.

Figure 10:
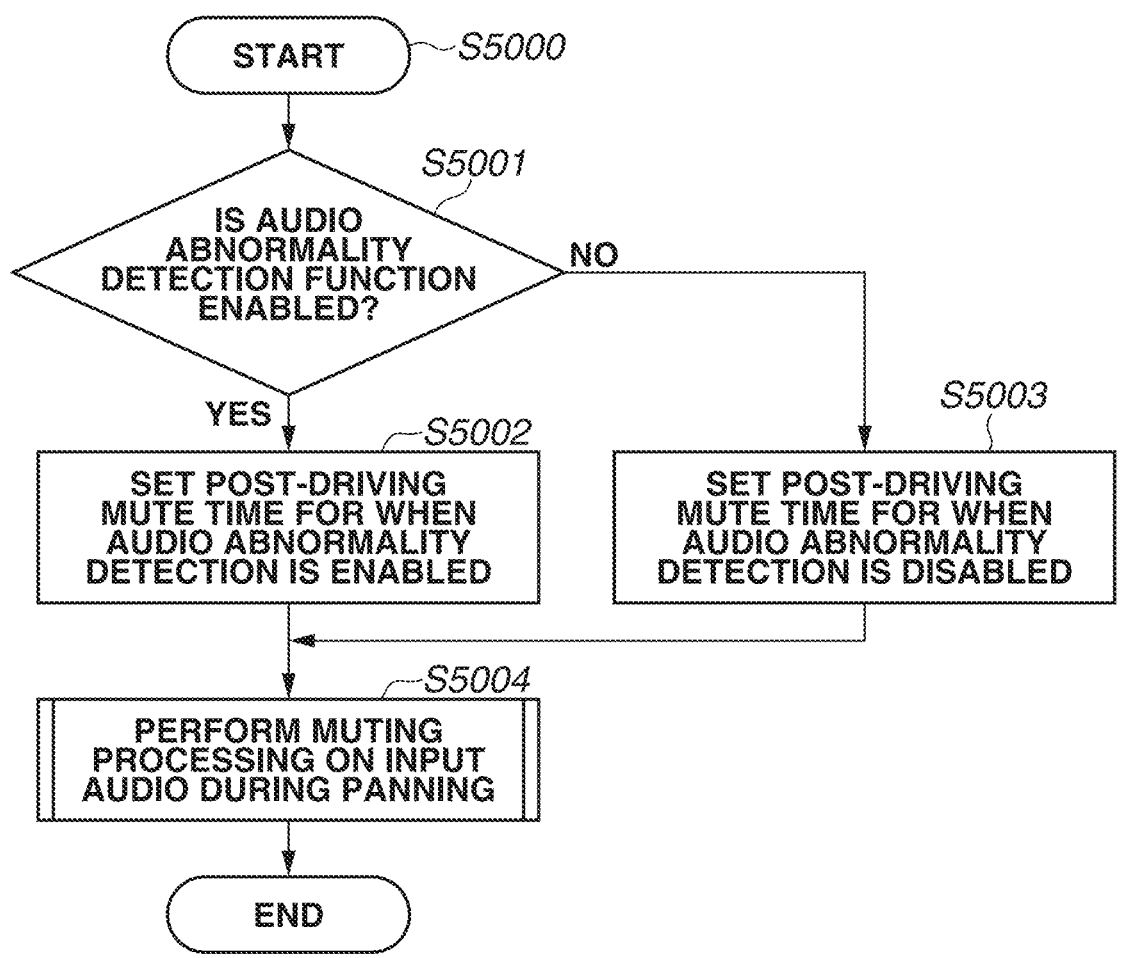
FIG. 10 is a flow chart illustrating muting processing according to audio detection which is performed by an image capturing apparatus according to a fifth exemplary embodiment.

Next, the following mainly describes a fifth exemplary embodiment in which a case of using an abnormality detection function using audio input is taken into consideration, with reference to FIG. 10. Processing which is similar to the processing in the first to fourth exemplary embodiments is given the same reference numeral, and description thereof is omitted.

Some network cameras include a function of detecting an abnormality using audio from the audio input unit. Examples include a volume detection function in which an abnormality is detected if the volume of input audio exceeds a predetermined level and a scream detection function in which a feature of a specific sound such as a scream of a person is identified from input audio by pattern matching to detect an abnormality. When the abnormality detection functions using audio are used, if the audio muting processing accompanying the driving of panning and tilting is executed, the audio data cannot be used during the muting processing. In this state, the abnormality detection function using the audio that the user desires to use is not operable.

Thus, when the abnormality detection function using audio is used, audio processing accompanying the driving of panning and tilting is performed to minimize the time during which the function is not operating.

FIG. 10 is a flow chart illustrating the muting processing according to audio detection. FIG. 10 illustrates a process executed by controlling the processing blocks of the image capturing apparatus 1000, and a program stored in the ROM 1020 included in the system control unit 1018 is developed into the RAM 1021 and executed by the CPU 1019 to realize the process.

In step S5001, the system control unit 1018 determines whether the abnormality detection function using audio is enabled. If the abnormality detection function using audio is enabled (YES in step S5001), the processing proceeds to S5002. On the other hand, if the abnormality detection function is disabled (NO in step S5001), the processing proceeds to step S5003.

In step S5002, the system control unit 1018 acquires the post-driving mute time for the time when the audio abnormality detection is enabled. For example, when the audio abnormality detection is enabled, the post-driving mute time is set shorter than that in the case in which the audio abnormality detection is disabled so that the time during which the function is not operable is shortened. For example, if the post-driving mute time is set 0 milliseconds, although unnecessary post-driving operation sounds can be input, the audio data is enabled immediately after the driving of panning and tilting is stopped so that the time during which the audio abnormality detection is not operating is shortened.

In step S5003, the system control unit 1018 acquires the post-driving mute time (similar to the mute time in the first to fourth exemplary embodiments) for the time when the audio abnormality detection is disabled.

In step S5004, the system control unit 1018 performs muting processing on input audio during the driving as in the above-described exemplary embodiments.

As described above, according to the present exemplary embodiment, the time during which the function is not operating is reduced to the shortest time possible when the audio abnormality detection is used according to the use state of the abnormality detection function using audio in the image capturing apparatus including the audio input unit and the driving unit.

While the case in which the post-driving muting processing is set not to be performed when the abnormality detection function using audio is used is described in the present exemplary embodiment, the configuration is not limited thereto. For example, the attenuation time and attenuation rate in the attenuation processing and the post-driving, pre-muting time can be changed as in the above-described exemplary embodiments. Further, for example, whether to perform the audio muting processing can be changed according to the type and set values of audio detection. For example, when a detection threshold value level set to the volume detection function is higher than a sound produced after the driving, the audio muting processing can be set not to be performed, because the sound produced after the driving is not likely to lead to erroneous detection in the volume detection.

The following describes a sixth exemplary embodiment. In a network camera without an encoder, an edge-contact operation is performed to set an initial position for panning and tilting at the time of activation/initialization. In controlling the panning and tilting, the edge-contact operation is not needed for a model with an encoder which detects the direction, amount, and angle of a movement of a rotatable/movable member, while a model without an encoder adjusts its initial position by contacting the mechanical end in panning and tilting operations. The edge-contact operation for the panning and tilting operations is repeatedly performed, so driving sounds are produced and stopped repeatedly and intermittently.

In the sixth exemplary embodiment, for example, processing for preventing recording of unnecessary audio data and erroneous detection of the audio detection function during a positioning operation for determining the imaging angle of view at the time of activation/initialization will be described in detail below with reference to FIG. 11. Processing which is similar to the processing in the above-described exemplary embodiments is given the same reference numeral, and description thereof is omitted.

Figure 11:
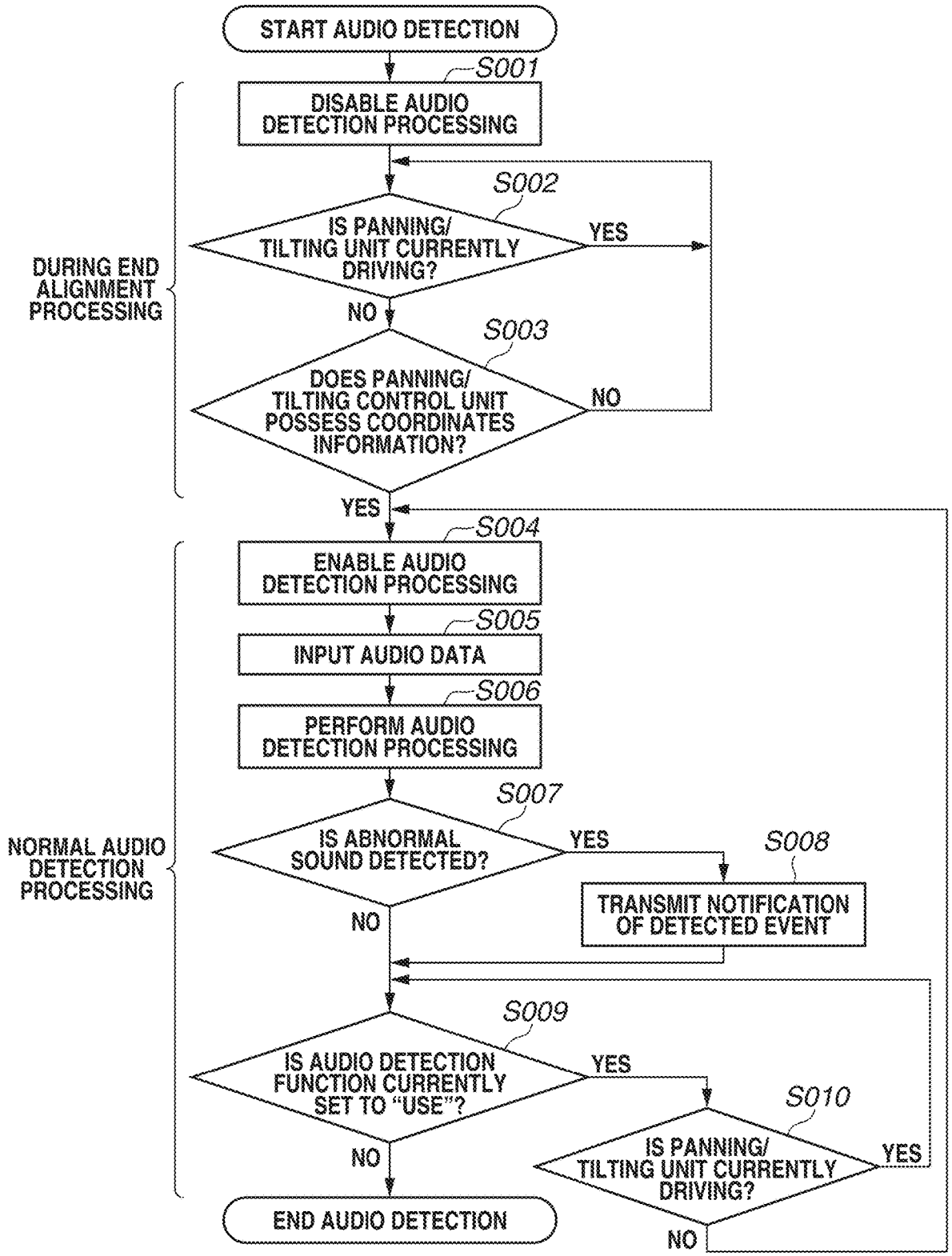
FIG. 11 is a flow chart illustrating an example of a process of audio detection processing according to the first exemplary embodiment.

FIG. 11 illustrates a process which is executed by controlling the processing blocks of the image capturing apparatus 1000, and a program stored in the ROM 1020 included in the system control unit 1018 is developed into the RAM 1021 and executed by the CPU 1019 to realize the process.

The process illustrated in FIG. 11 is started if the user sets the audio detection function to "use". In step S001, the audio detection processing is disabled as an initial state of the audio detection unit 1009.

In step S002, the panning/tilting unit 1003 acquires information from the state management unit 1006 and determines whether the panning/tilting unit 1003 is currently driving. If the panning/tilting unit 1003 is currently driving (YES in step S002), the panning/tilting state is checked repeatedly. On the other hand, if the panning/tilting unit 1003 is not currently driving (NO in step S002), the processing proceeds to step S003.

In step S003, the panning/tilting unit 1003 acquires information from the state management unit 1006 and determines whether the panning/tilting control unit 1001 possesses coordinates information. If the panning/tilting control unit 1001 possesses coordinates information (YES in step S003), it is determined that the series of panning and tilting operations of a sequential operation of initial positioning by edge-contact operation is completed, and the processing proceeds to step S004. On the other hand, if the panning/tilting control unit 1001 does not possess coordinates information (NO in step S003), it is determined that the edge-contact operation is still performed, and the processing returns to step S002. In an alternative embodiment this part of process allows audio detection to be disabled at a current time in which the coordinates information is not held.

In step S004, the audio detection processing of the audio detection unit 1009 is enabled.

Next, in step S005, the audio data input from the audio branching unit 1008 is input to the audio detection unit 1009.

In step S006, the audio detection unit 1009 performs processing to detect an abnormality from the audio data input from the audio branching unit 1008.

In step S007, whether an abnormal sound is detected by the audio detection unit 1009 is determined. If an abnormal sound is detected (YES in step S007), the processing proceeds to step S008. On the other hand, if no abnormal sound is detected (NO in step S007), the processing proceeds to step S009.

In step S008, the audio detection unit 1009 transmits a detected event notification to the event notification unit 1011.

In step S009, whether the user currently sets the audio detection function to "use" is determined. If the audio detection function is set to "use" (YES in step S009), the processing proceeds to step S010. On the other hand, if the audio detection function is not set to "use" (NO in step S009), the audio detection function is ended.

In step S010, whether the panning/tilting unit 1003 is currently driving is determined. If the panning/tilting unit 1003 is currently driving (YES in step S010), the processing returns to step S009, and the setting of the audio detection function and the determination about the driving of panning and tilting are repeated continuously until audio function notification is set off or the driving of panning and tilting is stopped.

As described above, the audio detection function is disabled until the edge-contact operation at the time of activation/initialization is completed, so that erroneous detection of the audio detection function is prevented.

While the processing to enable the audio detection processing if the panning and tilting operation is stopped and the coordinates information is stored (after the edge-contact operation is completed) is described in the present exemplary embodiment, the input audio can be muted instead. In this case, not only erroneous detection of an abnormal sound but also recording of unnecessary audio data can be reduced. Further, when audio input is received, the audio input can be configured not to be output to the audio branching unit 1008 or not to be transferred to the audio detection unit 1009 and the audio streaming unit 1010.

Figure 12:
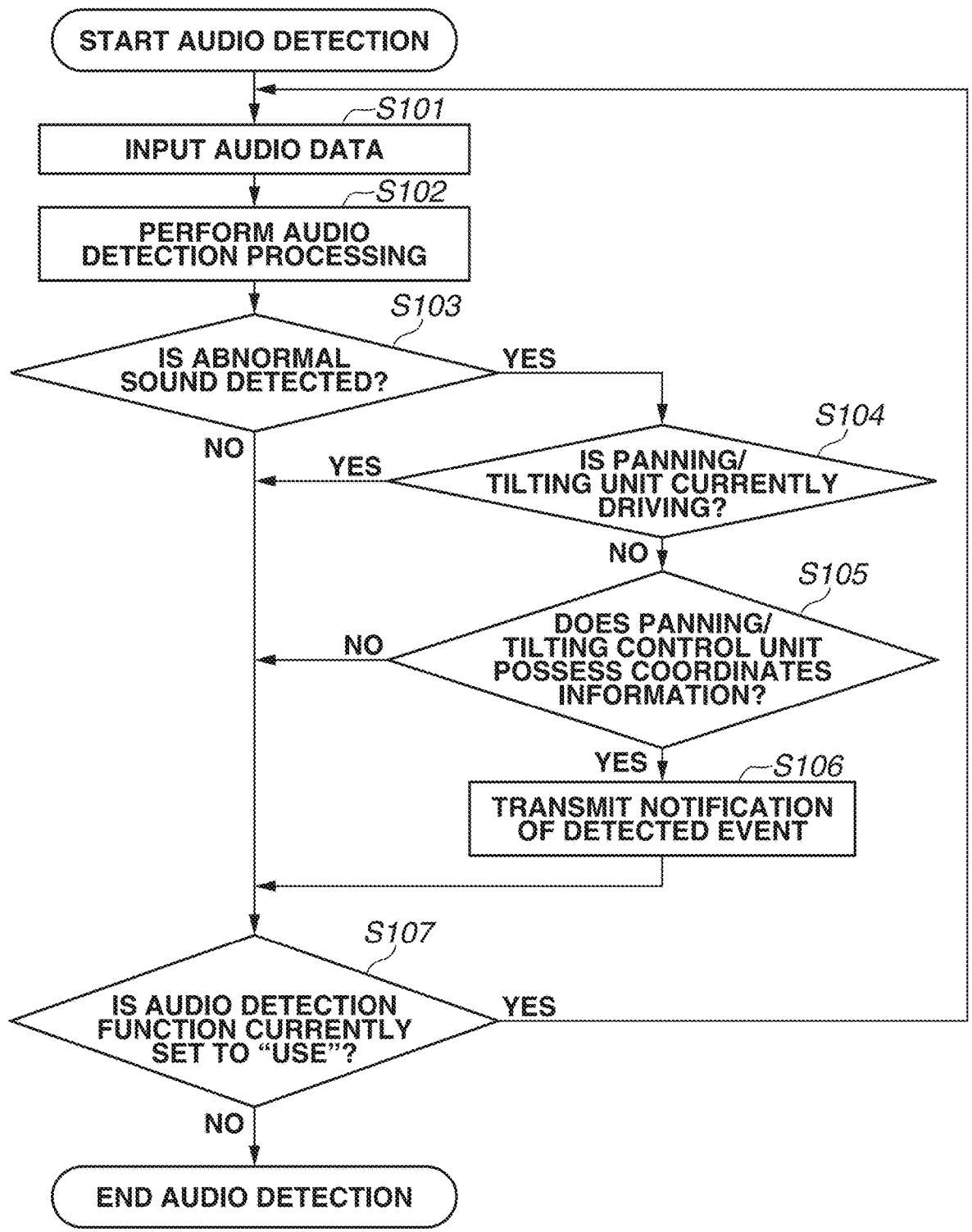
FIG. 12 is a flow chart illustrating an example of a process of audio detection processing according to the second exemplary embodiment.

The following describes a seventh exemplary embodiment in which control is performed not to transmit an event notification to the event notification unit until the edge-contact operation at the time of activation/initialization is completed to reduce erroneous detection of the audio detection function and prevent a decrease in usability, with reference to a flow chart illustrated in FIG. 12. Processing which is similar to the processing in the above-described exemplary embodiments is given the same reference numeral, and description thereof is omitted.

In the present exemplary embodiment, the audio information processing unit 1002 performs control to enable/disable event notification from the audio detection unit 1009 to the event notification unit 1011 based on the driving state and coordinates information received from the state management unit 1006.

More specifically, the audio information processing unit 1002 determines whether the sequential operation of initial positioning by edge-contact operation is being performed at the time of activation/initialization of the image capturing apparatus 1000, based on the driving state transmitted from the state management unit 1006 and the presence/absence of coordinates information. If the edge-contact operation is being performed, the event notification from the audio detection unit 1009 to the event notification unit 1011 is disabled. On the other hand, if the edge-contact operation is not being performed, the event notification is enabled.

FIG. 12 is a flow chart illustrating an example of audio detection processing according to the present exemplary embodiment. FIG. 12 illustrates a process executed by controlling the processing blocks of the image capturing apparatus 1000, and a program stored in the ROM 1020 included in the system control unit 1018 is developed into the RAM 1021 and executed by the CPU 1019 to realize the process.

The process illustrated in FIG. 12 is started if the user sets the audio detection function to "use". In step S101, the audio data input from the audio branching unit 1008 is input to the audio detection unit 1009.

In step S102, the audio detection unit 1009 performs processing to detect an abnormality from the audio data input from the audio branching unit 1008.

In step S103, whether an abnormal sound is detected by the audio detection unit 1009 is determined. If an abnormal sound is detected (YES in step S103), the processing proceeds to step S104. On the other hand, if no abnormal sound is detected (NO in step S103), the processing proceeds to step S107.

In step S104, whether the panning/tilting unit 1003 is currently driving is determined. If the panning/tilting unit 1003 is currently driving (YES in step S104), the processing proceeds to step S107. On the other hand, if the panning/tilting unit 1003 is stopped (NO in step S104), the processing proceeds to step S105.

In step S105, whether the state management unit 1006 of the panning/tilting control unit 1001 possesses coordinates information is determined. If the state management unit 1006 possesses coordinates information (YES in step S105), the processing proceeds to step S106. On the other hand, if the state management unit 1006 does not possess coordinates information (NO in step S105), the processing proceeds to step S107.

In step S106, the audio detection unit 1009 transmits an event notification of the detection result to the event notification unit 1011.

In step S107, whether the user currently sets the audio detection function to "use" is determined. If the audio detection function is set to "use" (YES in step S107), the processing proceeds to step S101. On the other hand, if the audio detection function is not set to "use" (NO in step S107), the audio detection function is ended.

As described above, the event notification of the detection result is disabled until the edge-contact operation at the time of activation/initialization is completed, so that erroneous detection of the audio detection function is decreased.

The processing to disable the audio data is not limited to the audio data muting processing. The processing can be realized by various methods such as disabling the function of the microphone unit 1004, attenuating the audio data, clearing the input audio, generating silent data, or not recording streamed audio data. It can be configured such that audio data is generated, but the audio branching unit 1008 does not output the audio data to the audio detection unit 1009 and the audio streaming unit 1010. The present exemplary embodiment is also applicable to a case in which control is performed in such a manner that the audio streaming unit 1010 does not stream audio data and the audio detection unit 1009 does not execute audio detection, and a case in which audio detection is performed but no notification of a result of the detection is transmitted as an event.

While the present invention has been described with reference to exemplary embodiments, it is to be understood that the invention is not limited to the disclosed exemplary embodiments and can be changed and modified as needed within the spirit of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-116562, filed Jun. 10, 2016, which is hereby incorporated by reference herein in its entirety.

What is claimed is:

1. An image capturing apparatus comprising:
   an image capturing unit configured to capture an image of an object;
   a driving unit configured to change an image capturing direction in a panning direction or a tilting direction of an image capturing unit;
   an audio input unit configured to collect a sound from outside of the image capturing apparatus to generate an audio signal;
   a memory to store a table indicating a relationship between panning directions and post-driving mute times; and
   a control unit configured to control an excitation of the driving unit after driving of the driving unit for changing the image capturing direction is stopped and to attenuate or disable an audio signal until a post-driving mute time corresponding to a current panning direction has passed since the excitation of the driving unit is stopped so that a noise which occurs due to moving a mechanical component of the driving unit can be reduced, the post-driving mute time being selected by referring to the table between panning directions and post-driving mute times stored in the memory.

2. The image capturing apparatus according to claim 1, wherein a predetermined time is set based on at least one of an installation state of the image capturing apparatus, a driving speed of the driving unit, coordinates information about the image capturing direction, and a delay time in processing of the audio processing unit.

3. The image capturing apparatus according to claim 1, further comprising a state management unit configured to hold coordinates information about the image capturing direction,
wherein the control unit attenuates or disables the audio signal if the coordinates information on a current time is not held.

4. The image capturing apparatus according to claim 1, wherein silent data is generated to attenuate or disable the audio signal.

5. An image capturing apparatus according to claim 1, further comprising:
an audio detection unit configured to detect an abnormality from the audio signal.

6. The image capturing apparatus according to claim 5, wherein the control unit disables the detection by the audio detection unit until a predetermined time has passed after the driving unit stops.

7. The image capturing apparatus according to claim 5, further comprising a state management unit configured to hold coordinates information about the image capturing direction,
wherein the control unit disables the detection by the audio detection unit if the coordinates information on a current time is not held.

8. The image capturing apparatus according to claim 5, wherein the control unit disables the detection by the audio detection unit by not outputting the audio signal to the audio detection unit.

9. The image capturing apparatus according to claim 5, wherein the control unit disables the detection by the audio detection unit by not notifying a user of a result of the detection by the audio detection unit.

10. The image capturing apparatus according to claim 1, wherein the control unit further attenuates or disables audio signal while the driving unit is driving.

11. The image capturing apparatus according to claim 1, wherein the control unit further attenuates or disables audio signal while the excitation is performing.

12. A method of controlling an image capturing apparatus comprising an image capturing unit configured to capture an image of an object, a driving unit configured to change an image capturing direction in a panning direction or a tilting direction of an image capturing unit, and a driving control unit configured to control the driving unit, the method comprising:
collecting a sound from outside of the image capturing apparatus to generate an audio signal;
controlling an excitation of the driving unit after driving of the driving unit is stopped monitoring the driving control unit;
selecting a post-driving mute time by referring to the table between panning directions and post-driving mute times stored in the memory; and
attenuating or disabling an audio signal until the selected post-driving mute time has passed since the excitation of the driving unit is stopped so that a noise which occurs due to moving a mechanical component of the driving unit can be reduced.

13. A non-transitory computer-readable storage medium storing a program for causing a computer to function as a method of controlling an image capturing apparatus comprising an image capturing unit configured to capture an image of an object, a driving unit configured to change an image capturing direction in a panning direction or a tilting direction of an image capturing unit, and a driving control unit configured to control the driving unit, the method comprising:
collecting a sound from outside of the image capturing apparatus to generate an audio signal;
controlling an excitation of the driving unit after driving of the driving unit is stopped monitoring the driving control unit;
selecting a post-driving mute time by referring to the table between panning directions and post-driving mute times stored in the memory; and
attenuating or disabling an audio signal until a selected post-driving mute time has passed since the excitation of the driving unit is stopped so that a noise which occurs due to moving a mechanical component of the driving unit can be reduced.

* * * * *